United States Patent [19]

Munters

[11] 4,152,901

[45] May 8, 1979

[54] METHOD AND APPARATUS FOR TRANSFERRING ENERGY IN AN ABSORPTION HEATING AND COOLING SYSTEM

[75] Inventor: Carl G. Munters, Minusio, Switzerland

[73] Assignee: Aktiebolaget Carl Munters, Sollentuna, Sweden

[21] Appl. No.: 752,730

[22] Filed: Dec. 21, 1976

[30] Foreign Application Priority Data

Dec. 30, 1975 [SE] Sweden .............................. 7514789

[51] Int. Cl.² .................... F25B 15/00; F25B 7/00; F25B 17/08
[52] U.S. Cl. .............................. 62/112; 62/79; 62/480
[58] Field of Search ............... 62/107, 112, 480, 494, 62/495, 79

[56] References Cited

U.S. PATENT DOCUMENTS

| | | | |
|---|---|---|---|
| 1,729,081 | 9/1929 | Miller | 62/480 |
| 1,964,391 | 6/1934 | Thomas | 62/112 |
| 2,802,344 | 8/1957 | Witherell | 62/112 |
| 3,621,665 | 11/1971 | Mokadam | 62/79 |
| 3,621,666 | 11/1971 | Mokadam | 62/79 |
| 3,828,566 | 8/1974 | Wetzel | 62/480 |

FOREIGN PATENT DOCUMENTS 62426  3/1924  Sweden .................................. 62/480

Primary Examiner—Lloyd L. King
Attorney, Agent, or Firm—Eric Y. Munson

[57] ABSTRACT

A method and apparatus for transferring energy in an absorption system according to the heat pump principle to improve the cycle efficiency thereof, in which the selected working medium is vaporized in an evaporator by heat exchange with heat source of ambient pressure and passed into a sorption station where it is brought into contact with an absorbent solution with consequent release of heat of absorption and heat of condensation. The mixture of absorbent solution and absorbed working medium is passed from the sorption station into a pressurized separating station, where the absorbent is separated from the working medium by diffusing the mixture under pressure through a semi-permeable membrane defining a zone of relatively high pressure and a zone of relatively low pressure higher than the ambient pressure, the concentrated absorbent solution being collected in the high pressure zone and the solution of working medium being received in the low pressure zone by virtue of the resultant reverse osmotic flow. The dilute solution of working medium is passed to the evaporator upon being depressurized, while the concentrated absorbent solution, upon being reduced to the ambient pressure, is passed into the sorption station.

6 Claims, 4 Drawing Figures

METHOD AND APPARATUS FOR TRANSFERRING ENERGY IN AN ABSORPTION HEATING AND COOLING SYSTEM

BACKGROUND OF THE INVENTION

This invention relates to a method and an apparatus for a closed sorption process.

More particularly, this invention relates to a closed circuit sorption process wherein a working medium circulates under different pressures and temperatures and is transformed successively into liquid phase, gas phase and into a mixture of liquid and a sorption agent which sorption agent in turn circulates between an absorption station and a separation station for the working medium.

A field wherein such a sorption process is practiced, are so-called heat pumps in which a working medium is transformed from liquid phase into gas phase in an evaporator at a relatively low temperature level, the evaporation heat being supplied by a surrounding low-grade heat source and the heat thus bound by the working medium is utilized to raise the temperature of a useful medium to a relatively higher temperature level, where the working medium reverts to its liquid phase and with consequent liberation of its vaporization heat. In heating a building space, for instance this useful medium is included in the heating system in the form of water, whereas in the evaporator the heat may be absorbed from a "heat source" of relatively low temperature level, such as consumed cooling water or air from an industrial process or similar sources which has a temperature of e.g. 20°–40° C. and which therefore is not by itself suitable for practical room heating at low external temperatures. The task of the heating pump is to make use of heat calories from such waste media and to transfer these calories to the useful medium so that it can be within a temperature range required by a radiator system for room heating. Experiments have also been made to use as heat source the water in lakes and the like at outside temperatures below 0° C.

THE PRIOR ART

It is known to have the working medium in a heat pump to circulate sequentially between an absorber, a boiler, an evaporator and back to the absorber. The process includes a sorption agent or adsorbent in liquid state which circulates together with the working medium between the absorber and the boiler where it is separated from the working medium which goes to the absorber. After the separation, the working medium vapors are condensed to liquid which again is evaporized in the evaporator, the heat of vaporization being taken from the "heat source". Thereafter, the vapor components of the working medium are absorbed in the absorber. The heat of vaporization released in the condensor and the absorber is utilized e.g. as useful heat in radiator equipped heating systems. The pressure differential required for circulating the working medium and the sorption agent in the closed process is maitained by a heat pump which, by way of example, may be, disposed e.g. between the absorber and the boiler.

In another type of prior art heat pump system, the closed system contains only the working medium which in gas phase is compressed by means of a compressor from a lower to a higher pressure and thereafter expanded into liquid phase. The released heat of vaporization is utilized e.g. for room heating. Thereafter, the working medium in liquid phase is passed to the evaporator where the working medium again is converted into vapor phase by the heat of evaporation picked up from the "heat source". The circuit is completed by conveying the evaporated working medium to the compressor for repeated pressurization.

In both of these prior art embodiments, the amount of heat which is used to heat the warm medium, such as the hot water in a radiator system, is greater than the corresponding amount of energy consumed in the boiler or compressor. However, the heat again will be limited in the first case in order to supply costly heat energy to the working medium in the boiler as well as for the evaporation, in addition to the mechanical energy consumed by the pump in pumping the liquid medium, whereas in the second case the gaseous working medium requires a compressor of large dimensions.

MAIN OBJECTS AND ADVANTAGES OF THE INVENTION

One main object of the invention thus is to improve the heat economy or efficiency of the closed sorption process. One important feature of the invention resides in the fact that the process is carried out without addition of costly heat energy from outside for separating the sorption agent from the working medium.

Another object of the invention is the separation of the working medium and sorption agent from one another while both media are in liquid phase.

Still another object of the invention is to provide a heat pump, for use in a closed sorption process including an evaporator which can produce a large amount of heat from a low-grade heat source which then can be increased to a desired higher level by the absorption step. This low-grade heat source may consist of water or air, which air may be at temperatures below 0° C. without the need of supplying any significant additional heat from a higher-grade.

SUMMARY OF THE INVENTION

In terms of broad inclusion, the invention contemplates an improved method and apparatus for transferring energy by reverse osmotic flow in a closed absorption system according to the heat pump principle. The working medium, which may consist of water, ammonia or other conventional refrigerants, is circulated through the system successively in liquid phase, vapor phase, liquid-absorbent mixture phase, and back to liquid phase. The mixture of working medium and absorbent solution, which may consist of ethylene glycol or a salt, e.g., lithium cloride, lithium nitrate, or other suitable absorbents, is circulated between the sorption station and a separating station, where the absorbent is separated from the working medium by diffusing the mixture through a semi-permeable membrane defining a zone of relatively high pressure and a zone of relatively low pressure, to cause the absorbent mixture to concentrate and collect in the zone of relatively high pressure, while the working medium is caused to flow into the zone of relatively low pressure, from which it is passed to a conventional evaporator, while the concentrated absorbent solution is passed into the sorption station, after first having been depressurized, where it is brought into contact with the vaporized medium from the evaporator.

The solution of working medium from the zone of relatively low pressure is passed through an expansion means preliminary to being passed into the evaporator, wherein it becomes vaporized as it picks up heat from a low grade energy source such as spent cooling water, lake water, etc. The thus vaporized working medium is passed into the sorption station, where it is absorbed by the concentrated absorbent from the high pressure zone. The heat of adsorption and conpensation is picked up by a fluid heating medium which is circulated through a tubular coil in the sorption station to a heating appliance in an enclosure to be heated.

The pressure in the relatively high pressure zone is calculated according to the selected working medium and is maintained at the calculated pressure by means of a pump connected to the sorption station, thus creating the reverse osmotic flow which causes the more concentrated solution to flow away from the more dilute solution, in contrast to the normal osmotic flow. The solution of working medium in the relatively low pressure zone is approximately at its saturation point, i.e., in a state of equilibrium, and is maintained at its saturation temperature while being passed to the evaporator.

It should be understood that the pressure on the low pressure side of the separator, while lower than the pressure in the high pressure side, still must be sufficiently high so as to be at least equal to condensation pressure of the working solution, in order to maintain it in liquid phase during its passage to the evaporator. Consequently, the pressure must be calculated according to the selected working medium.

Similarly, the pressure on the high pressure side must be calculated according to the selected working medium and the selected absorbent, and their relative weight determined accordingly. It should be understood that the pressure differential between the high pressure side and the low pressure side must be sufficiently high to supply the power to separate the mixed solution of working medium and absorbent by reverse osmotic flow.

A turbine may be used to reduce the pressure of the high pressure concentrated absorbent mixture prior to its entry into the absorber, and the pressure energy may be converted into mechanical energy to drive the pressurization pump.

Obviously, the improved cycle may be used for cooling as well as for heating, simply by reversing the cycle as done heretofore when an absorption refrigeration system was converted into a heating system.

THE DRAWINGS

Further objects and advantages of the invention will become apparent from the following description considered in connection with the accompanying drawings which form part of this specification and of which:

DETAILED DESCRIPTION OF SOME PREFERRED EMBODIMENTS

Figure 1:
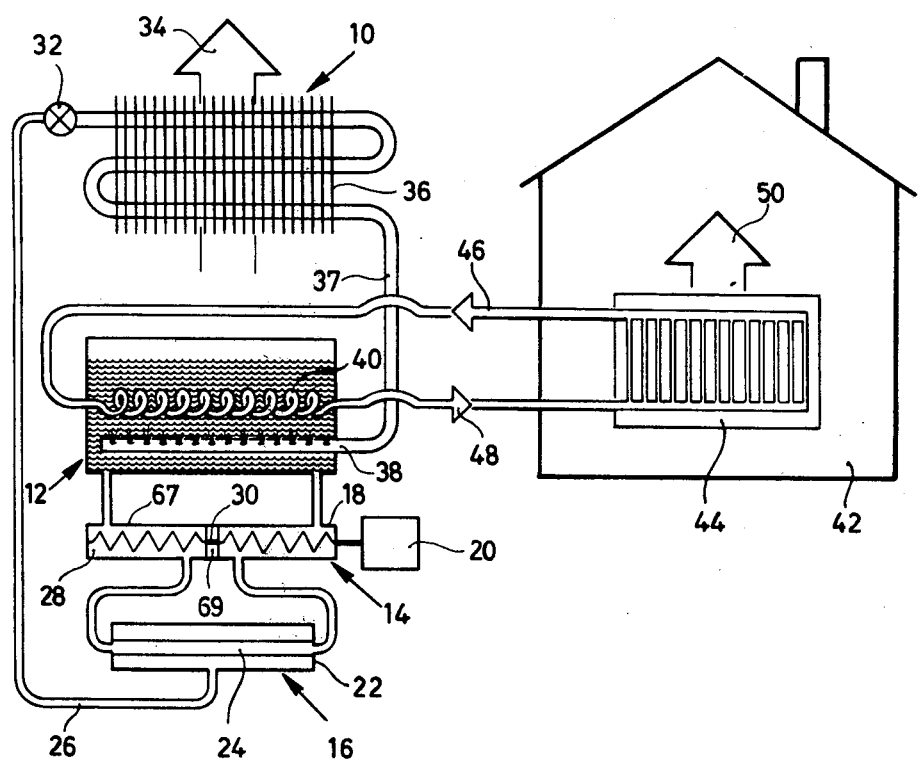
FIG. 1 is a diagrammatic representation of the inventive system when used for the heating of a building.

Referring to the drawings and in particular FIG. 1, the system of the invention generally includes a heat pump system, which includes the closed circuit shown in the left-hand part of the figure. The solution of working medium which circulates in the system is passed through an evaporator unit 10, an absorber unit 12, a pump system 14 and a separator unit 16. The system also includes an absorbing agent or absorbent which together with the working medium circulates between the absorber unit 12 and the separator unit 16. The absorbing agent is passed through the absorber unit 12 under a relatively low pressure $P_0$ and absorbs the vaporized working medium coming from the evaporator unit 10. From the absorber 12 the mixture of absorbing agent and working medium solution is pumped by a pump 18 driven by a motor 20, through the separator unit 16 which includes a pressure-tight casing 22 into which are inserted one or several semi-permeable films or membranes 24 defining two pressure zones in the separator, viz, a high pressure zone on the pump side of the separator unit within which a pressure $P_1$ prevails, and a low pressure zone, within which a lower, although still relatively high pressure prevails. During the passage over the semi-permeable films or membranes, the mixture is concentrated by diffusion of working medium through the films or membranes outwards into the low pressure zone which through a pipe 26 is connected with the evaporator unit 10. The concentrated mixture on the high pressure side is passed through a pressure-reducing means 28 by which the pressure is reduced to the level $P_0$, whereupon the concentrated mixture is introduced into the absorber under pressure $P_0$. The pressure-reducing means 28 preferably has the form of an engine or turbine disposed so that the main part of the pressure energy of the mixture concentrated in the high pressure zone is converted into mechanical energy which in turn surplus power to the pump 18, as is indicated diagrammatically at 30.

On the low pressure side of the semi-permeable films or membranes 24 the diffused solution of working medium is still in liquid state and has a pressure $P_2$, which is at or slightly above the saturation pressure for the saturated working solution at the temperature which it maintains while being passed to a throttling member 32 inserted between the duct 26 and the evaporator unit 10. When the working medium is passed into the evaporator 10 through the throttling member 32, the pressure drops to the level $P_0$, and it becomes vaporized as it picks up heat from the surroundings, i.e. the "heat source". This "heat source", as already mentioned may consist of spent cooling water or air from an industrial process, or it may consist of lake water or ambient air, which is particularly advantageous in winter time even if the outside temperature should be below 0° C. The medium constituting the heat source streams through the evaporator 10 as is indicated by arrow 34. This evaporator unit 10 is provided in usual manner with ribs 36 to increase the heat exchange surface. From the evaporator 10 the working medium is conducted to the absorber 12 where it is brought into contact with the mixture concentrated in the separator unit 16 and is absorbed by said mixture. The vapor coming from evaporator 10 is introduced near the bottom of the absorber through a perforated tube 38, for example, so that the vapor is allowed to bubble through the mixture condense. The heat of the condensation, i.e. the heat supplied in the evaporator by the working medium is liberated at this point, and this heat is used, as for example is shown in FIG. 1, to heat a coil tube 40 located in the liquid contained in the absorber 12. The coil tube 40 forms part of a circulation system, which in the example shown consists of a heating system for a building 42. As shown by the arrow 46, a suitable fluid heating medium is circulated from a radiator 44 in the building 42 through the coil tube 40 where it is heated by the heat yielded by the working medium, whereupon the heated useful medium is returned to the radiator 44 in the building 42, as indicated by arrow 48. The radiator system can be used, for example, to heat air circulating in the building, as is diagrammatically indicated by arrow 50.

Water may be considered as the working medium in the heat machine or absorption machine shown in FIG. 1, but in view of the possibility that the heat of vaporization may be so low as to cause the water to freeze, other working media are preferred, for example ammonia. When water is used, ethylene glycol or a salt, such as lithium chloride, for example, may be used as absorbent. When ammonia is used as working medium lithium nitrate, for example, may be used as the absorbent. It should be noted especially that an absorbing agent of a higher molecular weight results in a higher driving power in the separator station of the machine. If it is desired to operate with an evaporation temperature of $-30°$ C. for ammonia, the pressure in the evaporator must be below 1.5 bars. The pressure $P_2$ is determined by the necessity of keeping the working medium in liquid phase in the separator and during its continued flow to the throttling member 32 which may be an expansion valve or a capillary tube. If the working medium should be evaporated totally or partly ahead of the throttling member 32, heat of evaporation would be taken from the environment which is not intended. Therefore, the pressure $P_2$ must at least be so high as to be equal to the condensation pressure of the working medium streaming towards the throttling member 32 at its highest temperature while flowing from the separator 16 to the throttling device 32. Assuming, for example, that this temperature is $-30°$ C., the pressure $P_2$ with ammonia as working medium should be at least about 12 bars.

Figure 2:
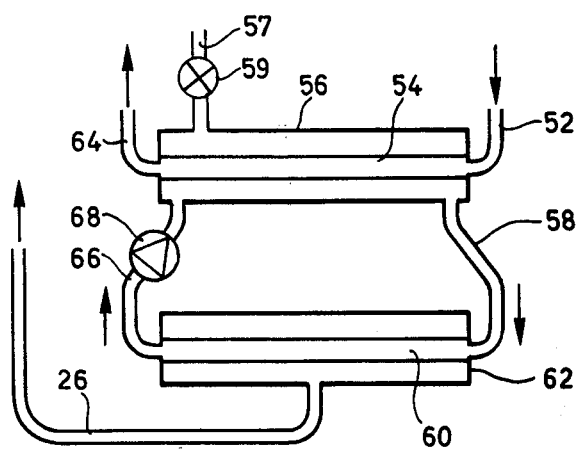
FIG. 2 illustrates a two-step process for the separator unit shown diagrammatically in FIG. 1.

The pressure $P_1$ in the high pressure zone of the separator unit depends on a number of factors. The greater the weight ratio between the absorption agent and the refrigerant, the greater becomes pressure that is required to create the reversed osmosis. When lithium nitrate is used as absorbing medium the weight ratio 3:1 cannot be exceeded substantially. With higher concentrations the danger of supersaturation and precipitation of crystals is encountered. The mixture of high concentration between ammonia and lithium nitrate may require pressure differences ranging between 200 and 400 bars or even more between $P_1$ and $P_2$. This pressure necessary for the separation is taken up in the embodiment shown in FIG. 1 by a film or membrane in one step. In order to reduce the pressure difference over each individual film or membrane, the separation process may be subdivided into several steps. FIG. 2 illustrates a two-step process where the liquid mixture coming from the absorber enters through a pipe 52 to a semi-permeable membrane 54 which is enclosed in a pressure-proof casing 56. In passing across the membrane the mixture of absorbent and working medium is concentrated due to the fact that the latter to a major part passes through the membrane 54 to a secondary circuit which is connected with another semi-permeable membrane 60 by means of a pipe 58, enclosed in a pressure-proof casing 62. The concentrated mixture from the primary circuit in the first separating step leaves the latter through a pipe 64. The working medium which passes through the semi-permeable membrane 60 in the second separating step is conducted as in the embodiment of FIG. 1 through the pipe 26 to the evaporator unit 10 in the closed circuit. The concentrated mixture of absorbing agent and working medium is returned from the second separating step to the first one via a pipe 66 into which is inserted a pump 68 which maintains a correct circulation in the secondary circuit of the first separating step. If, for example, the pressure of the liquid coming from the absorber through the pump 18 is 400 bars and the pressure of the working medium which is recycled through the pipe 26, is 12 bars, the pressure in the secondary circuit 58, 66 will lie between these two values and the liquid in the secondary circuit will consist of a mixture of working medium and absorbing agent where the concentration of the working medium also lies between the values in the mixture coming in from the pipe 52 and the unpurged working medium. In FIG. 2, the secondary circuit 58, 66 in the upper or first separation step is connected to the low pressure side, whereas the same secondary circuit in the lower or second separation step constitutes the high pressure side. The secondary circuit 58, 66 is connected to the primary circuit 52, 64 on the low pressure side thereof by means of the pipe 57 and the valve 59. This connection makes it possible to supply the circuit 58, 66 with a correctly adjusted quantity of liquid when the system is being filled up. The valve 59 has an installed safety cut-off against excess pressure developing in the circuit 58, 66. At a predetermined excess pressure, the safety valve opens and lowers the pressure in the circuit.

Obviousuly, if necessary, the pressure can be subdivided into still more steps in order to reduce the pressure difference in each individual step without departing from the scope of the invention.

Figure 3:
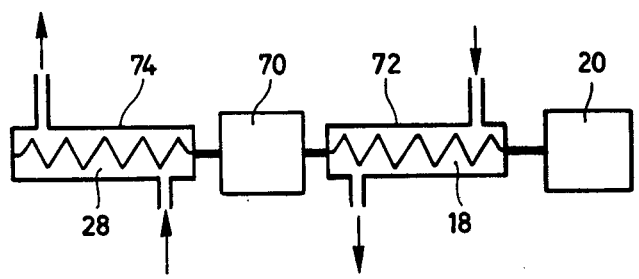
FIG. 3 illustrates a modified embodiment of the pump unit forming part of the system.

The above-stated high pressures and pressure differences demand also a relatively great pumping power. For this reason the recovery effected in the turbine 28 of a portion of the energy supplied to the liquid mixture is of great importance. The pumping work to be done, however, does not depend only on the pressure, but also on the quantity of liquid to be pumped up from the pressure $P_0$ to the pressure $P_1$ and this quantity in turn depends on the increase of concentration effected in the separator unit 16. A moderate pressure increase requires large liquid flows to pass through the pump 18 but implies, on the other hand, that the dimensions of the separator unit 16 become small. The pump 18 as well as the turbine 28 may be of any type suited for the pressure differences in question. Double-screw units of the displacement type have proved to be advantageous. In connection with great pressure differences considerable axial forces also may be created which cause problems with the bearings which problems are difficult to solve but can be overcome according to the invention by arranging the pump 18 and the turbine 28 in the manner shown in FIG. 1. The screws in the pump 18 or the turbine 28 are in this connection mounted on a common shaft, and the liquid in the pump and the turbine, respectively, are conducted in different directions, so that the axial forces exerted on the pump and the turbine act in different directions which arrangement relieves the bearings. The pump 18 and the turbine 28 are in this case suitably located in a common casing or housing 67 and the two stages are separated from one another inside the housing by a sealing partition wall 69. In this way, the axial forces can be counter-balanced, so that no or only insignificant axial forces must be transferred to the housing. When dimensioning the screws it is necessary, in order to obtain best possible relief, to see that the liquid quantity and the pressure in the turbine 28 are somewhat lower than in the pump 18. Depending on the degree of concentration obtained in the separator unit 16, the liquid quantity in the turbine may be lower by some few percent up to between 10 and 20 percent. The pressure can be slightly lower at the inlet of the turbine 28 than at the outlet of the pump 18 as a consequence of the frictional pressure drop in the separator unit 16. In order to obtain optimum recovery efficiency under varying conditions of operation, for example, when the degree of concentration produced in the separator unit 16 is varied in response to different operating conditions, it may be advantageous to be in a position to vary the number of revolutions of the pump 18 and the turbine 28 relatively to one another. For this purpose, as shown in FIG. 3, a gear unit 70 may be positioned between the pump 18 and the turbine 28 which in this situation are each disposed in its individual housing 72 and 74, respectively, the pump 18 being driven by the motor 20 in the same manner as illustrated in FIG. 1.

Figure 4:
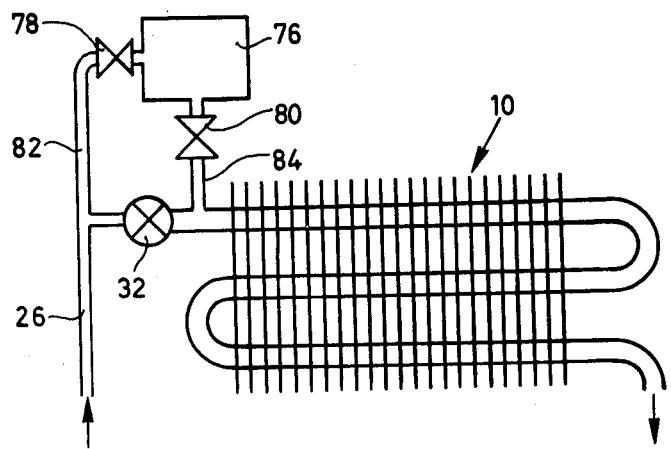
FIG. 4 shows a modified embodiment of the evaporator unit indicated in FIG. 1.

In order to adapt the system to different conditions of operation the same can also be modified in the manner illustrated in FIG. 4. As will be seen from this figure, which shows a portion of the pipe 26 from the separator unit 16, the pressure-reducing or expansion device 32 and the evaporator unit 10, there is added a storage container 76 which is connected to both sides of the expansion valve 32 by means of pipes 82, 84, and interposed cut-off valves 78, 80. By opening the valve 80 and keeping the valve 78 closed, the system can be supplied with more working medium. If, on the other hand, the valve 80 is kept closed and the valve 78 opened, working medium is removed from the system. In this manner, the quantity of working medium can be varied relatively to the quantity of absorbent, so that the ratio between these two media is adapted to various cases of operation, such as different vaporization temperatures and/or different temperatures of the working medium in the absorber. In continuous operation under definite conditions both valves 78, 80 must be closed.

In the separating process one cannot exclude the possibility that small quantities of absorbent may penetrate through the semi-permeable films or membranes and follow along with the working medium during its to and through the throttling member 32. Therefore, it is important that the throttling member 32 and the evaporator unit 10 are disposed in such a manner relative the absorber 12 that such accompanying absorbing agent, which of course cannot be transformed into gaseous state in the evaporator, should be permitted to return to the absorber without any noticable accumulation thereof in the evaporator. This can be accomplished, for example, by disposing the evaporator unit on a higher level than the absorber 12 and connecting it with the latter via a tube 37 that has a slope determined with regard to the drainage.

BRIEF DESCRIPTION OF POSSIBLE MODIFICATION OF THE INVENTION

It is clear that the shown embodiments are examples only of application of the invention and that changes and modifications can be made therein without departing from the basic idea of the invention. Thus, for example, the evaporator unit 10 in the figures has been indicated as a tubular element provided with ribs, which is especially suited when the heat source is air or some other gaseous medium. Of course, other embodiments also are conceivable for the evaporator unit 10, especially when the heat source consists of liquids or other fluids. The separator unit 16, which has been shown diagrammatically as a casing or housing which is passed by a preferably porous tube which constitutes carrier for the semi-permeable film or membrane and through which the mixture of absorbing agent and working medium is diffused by reverse osmotic pressure take some other form. Thus, it is possible to use a plurality of tubes coupled in parallel or alternate arrangements of known type to provide a sufficient separation capacity for the shown system.

With an absorption process of the kind described herein, the power requirements can be reduced substantially, in comparison with conventional processes of the kind in consideration, by using reversed osmotic flow according to the invention to effect the separation between working medium and absorbing agent. The service life of the semi-permeable films or membranes will in such system or process also be greatly increased, since in a closed process no impurities are added from outside. Such contamination constitutes a great problem in other known open systems where reverse osmosis is used to effect a separation, for example when desalting sea water.

The shown system has been described in a preferred manner to generate heat according to the heat pump principle, but it is clear that the invention is not limited thereto. Without departing from the scope of the invention the system can also be employed for refrigeration, in which case the evaporator unit 10 is conventionally located in the space where cooling is desired.

While several more or less specific embodiments of the invention have been shown and described it is to be understood that this is for purpose of illustration only, and that the invention is not to be limited thereby, but its scope is to be determined by the appended claims.

What is claimed is:

1. In a closed absorption system based on the heat pump principle, in which a solution of working medium is vaporized in an evaporator by heat exchange with an energy source and the vaporized solution is passed into an absorber where it is brought into contact with an absorbent solution, the heat of condensation being removed from the absorber for use to condition an enclosure, the improvement comprising:
   (a) a pressure sealed separation means having a high pressure and a low pressure zone;
   (b) a semi-permeable membrane defining said high pressure zone and said low pressure zone;
   (c) means for passing a mixture of absorbent solution and working medium into said separator means;
   (d) means for pressurizing said mixture effective to separate and collect a concentrated solution of absorbent in said high pressure zone and the working medium solution in said low pressure zone by reverse osmotic flow through said semi-permeable membrane;
   (e) energy transfer means between said high pressure zone and said absorber to depressurize said concentrated absorbent solution;
   (f) means for passing said pressurized concentrated absorbent solution through said energy transfer means into said absorber;
   (g) expansion means connected to said evaporator; and
   (h) means for passing said separated working solution through said expansion means to said evaporator.

2. The absorption system according to claim 1, in which a heat exchanger is located in the absorber for picking up the heat of condensation and connected to an energy transfer appliance located in an enclosure to be conditioned.

3. The absorption system according to claim 1, in which the energy transfer means for depressurizing the concentrated absorbent solution comprises turbine means.

4. The absorption system according to claim 3, comprising pump means located between the absorber and the separation means for pressurizing the mixture of absorbent solution and absorbed working medium.

5. The absorption system according to claim 4, in which said turbine means are effective to actuate said pump means.

6. The absorption system according to claim 2, in which the separating means comprise a plurality of units each comprising a semi-permeable membrane and interconnected in a closed circuit to carry out the concentration of the mixture of absorbent solution and working medium in successive steps.

* * * * *